US012703562B2

(12) United States Patent
Job et al.

(10) Patent No.: US 12,703,562 B2
(45) Date of Patent: Aug. 11, 2026

(54) DETERGENT PRESENTATION FORM

(71) Applicant: HENKEL AG & CO. KGAA, Düsseldorf (DE)

(72) Inventors: Mareile Job, Leverkusen (DE); Steffen Ristau, Düsseldorf (DE); Arno Düffels, Düsseldorf (DE); Marouane Jaafour, Willich (DE); Matthias Sunder, Düsseldorf (DE)

(73) Assignee: Henkel AG & Co. KGaA, Düsseldorf (DE)

( * ) Notice: Subject to any disclaimer, the term of this patent is extended or adjusted under 35 U.S.C. 154(b) by 235 days.

(21) Appl. No.: 18/280,246

(22) PCT Filed: Jan. 13, 2022

(86) PCT No.: PCT/EP2022/050612
§ 371 (c)(1),
(2) Date: Sep. 4, 2023

(87) PCT Pub. No.: WO2022/184334
PCT Pub. Date: Sep. 9, 2022

(65) Prior Publication Data

US 2024/0067443 A1 Feb. 29, 2024

(30) Foreign Application Priority Data

Mar. 3, 2021 (EP) .................................... 21160483

(51) Int. Cl.
*B65D 85/00* (2006.01)
*C11D 17/04* (2006.01)

(52) U.S. Cl.
CPC .............. *B65D 85/54* (2013.01); *C11D 17/04* (2013.01); *B65D 2585/54* (2013.01)

(58) Field of Classification Search
CPC . B65D 81/24; B65D 5/02; B65D 5/66; B65D 75/002; B65D 77/02; B65D 85/54;
(Continued)

(56) References Cited

U.S. PATENT DOCUMENTS 6,074,093 A * 6/2000 Anderson ............ B65D 5/4295 383/110
8,763,800 B2 * 7/2014 Agirbas ........... B65D 85/10564 206/256
(Continued)

FOREIGN PATENT DOCUMENTS

CN 109153949 * 1/2019
DE 10018003 A1 10/2001
(Continued)

*Primary Examiner* — Rafael A Ortiz
(74) *Attorney, Agent, or Firm* — Blank Rome LLP

(57) ABSTRACT

A detergent supply form includes an outer packaging made of cardboard in the form of a single-piece folding box having a bottom surface and four side surfaces hinged to the bottom surface, a top surface and at least three side surfaces hinged to the top surface, and cuboid detergent shaped bodies. The outer packaging has a fill-level of 85 vol % to 99 vol %, and in the closed state, the side surfaces of the outer packaging hinged to the top surface overlap with the side surfaces hinged to the bottom surface of the outer packaging.

13 Claims, 3 Drawing Sheets

(58) Field of Classification Search
CPC ................ B65D 85/62; C11D 17/0039; C11D 17/0047; C11D 17/0056; C11D 17/0073; C11D 17/04
USPC ............ 206/499, 449, 524.1, 246, 271, 256, 206/273 D, 736; 229/120.02
See application file for complete search history.

(56) References Cited

U.S. PATENT DOCUMENTS

| | | | | |
|---|---|---|---|---|
| 2004/0004016 | A1* | 1/2004 | Rawat | B65D 5/5028 206/499 |
| 2005/0241980 | A1 | 11/2005 | Schmitt et al. | |
| 2014/0263594 | A1* | 9/2014 | Leidal | B65D 5/48024 229/199 |
| 2018/0207895 | A1* | 7/2018 | Lau | B31B 50/62 |

FOREIGN PATENT DOCUMENTS

| | | | | | |
|---|---|---|---|---|---|
| GB | 957821 | A | | 5/1964 | |
| WO | WO-0220361 | A1 | * | 3/2002 | B65D 83/0463 |
| WO | WO-0230786 | A1 | * | 4/2002 | B65D 5/4237 |
| WO | WO-2004046297 | A1 | * | 6/2004 | C11D 17/0078 |
| WO | 2004058580 | A1 | | 7/2004 | |
| WO | WO-2005118421 | A1 | * | 12/2005 | B65D 77/02 |
| WO | WO-2017198567 | A1 | * | 11/2017 | B65D 43/0202 |

* cited by examiner

DETERGENT PRESENTATION FORM

CROSS-REFERENCE TO RELATED APPLICATIONS

This application is a National Stage of International Patent Application No. PCT/EP2022/050612, filed Jan. 13, 2022, which claims foreign priority to European Patent Application No. 21160483.0, filed Mar. 3, 2021, the disclosures of which are hereby incorporated by reference herein in their entireties.

FIELD OF THE INVENTION

The present invention relates to a detergent supply form comprising an outer packaging and detergent shaped bodies which are in a sorted arrangement in the outer packaging. In particular, the invention relates to detergent supply forms which have sorted detergent shaped bodies and outer packagings with high fill-levels.

BACKGROUND

Continuously changing requirements are imposed on the forms of manufacture and supply of detergents and cleaning agents. The main focus has, for quite some time, been on the convenient metering of detergents and cleaning agents by the consumer and the simplification of the work steps necessary for carrying out a washing or cleaning method. One technical solution is provided by pre-portioned detergents or cleaning agents—for example, water-soluble containers having one or more receiving compartments for solid or liquid detergents or cleaning agents. A further technical solution is provided by detergent tablets which can be of single-phase or multi-phase design.

Not only water-soluble containers, but also detergent tablets are generally hygroscopic due to the active substances contained therein. To prevent water absorption, the pre-portioned detergent or cleaning agent dosing units are individually packaged by means of water-impermeable packaging means—for example, flow packs based upon water-insoluble polymer films. Alternatively, a plurality of detergent or cleaning agent dosing units can be assembled in a container which for its part has a water vapor barrier and in this way reduces water ingress into the dosing units.

Regardless of whether the packaging means used to reduce water ingress enclose individual detergent or cleaning agent dosing units or a plurality of detergent or cleaning agent dosing units, their use is not desirable for ecological reasons. One aim in the development of new types of detergent supply forms is therefore to provide packaging solutions and packaging forms which, on the basis of recycled or recyclable or biodegradable materials, realize as far as possible the technical advantages of biologically unrecycled or non-recyclable or non-biodegradable materials. A starting point for this development is offered by the optimization and development of already existing, sustainable technical solutions.

A technical problem which enjoys particular attention in relation to detergent or cleaning agent dosing units, and in particular to detergent or cleaning agent tablets, is to ensure stability during the transportation and storage of these dosing units. The concept of transportation and storage stability covers not only the assurance of the physical stability of the detergent or cleaning agent dosing units, e.g., against breakage, but also the assurance of the chemical stability of the detergent or cleaning agent dosing units—for example, against premature abreaction and disintegration of the 3-D shape caused by abreaction. A classic approach to ensuring the transportation and storage stability of detergent or cleaning agent tablets consists in the packaging of these tablets by means of individual flow pack packaging with three-sided weld seams and the fin seams characteristic of these flow packs. These flow packs are generally produced from non-biodegradable, water-insoluble polymer films and, in addition to the detergent or cleaning agent dosing unit, also enclose a considerable volume of air. Under mechanical stress, this air volume and the above-mentioned fin seams ensure the physical integrity of the dosing units due to their damping effect. In addition, the water-insoluble polymer films prevent an unwanted ingress of water from the ambient air and thus also chemically stabilize the detergent or cleaning agent dosing units.

SUMMARY OF THE INVENTION

Against the background of the prior art described above, it has been the object of the application to provide detergent portion units which can be produced by means of simplified methods, which have a high degree of transportation and storage stability, and which can be put together in a simple manner using the smallest amounts of packaging materials. After all, the detergent portion units should have a high product performance and be easy and safe to handle for the consumer.

DETAILED DESCRIPTION

Figure 1:
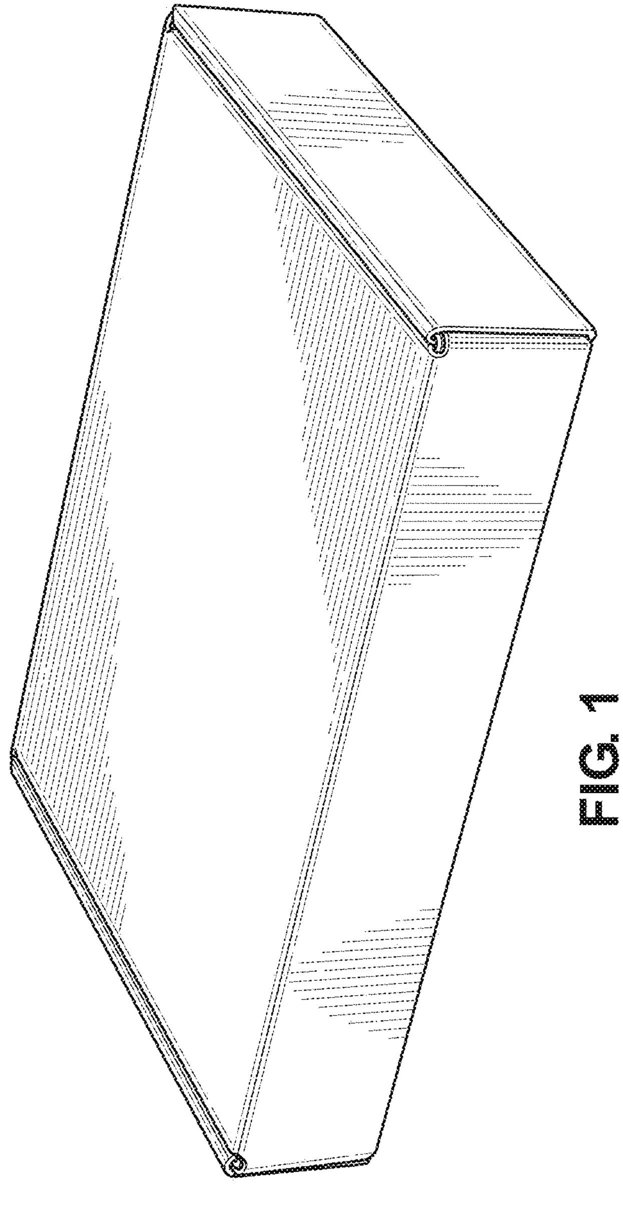
FIG. 1 illustrates an example of a closed outer packaging.
Figure 2:
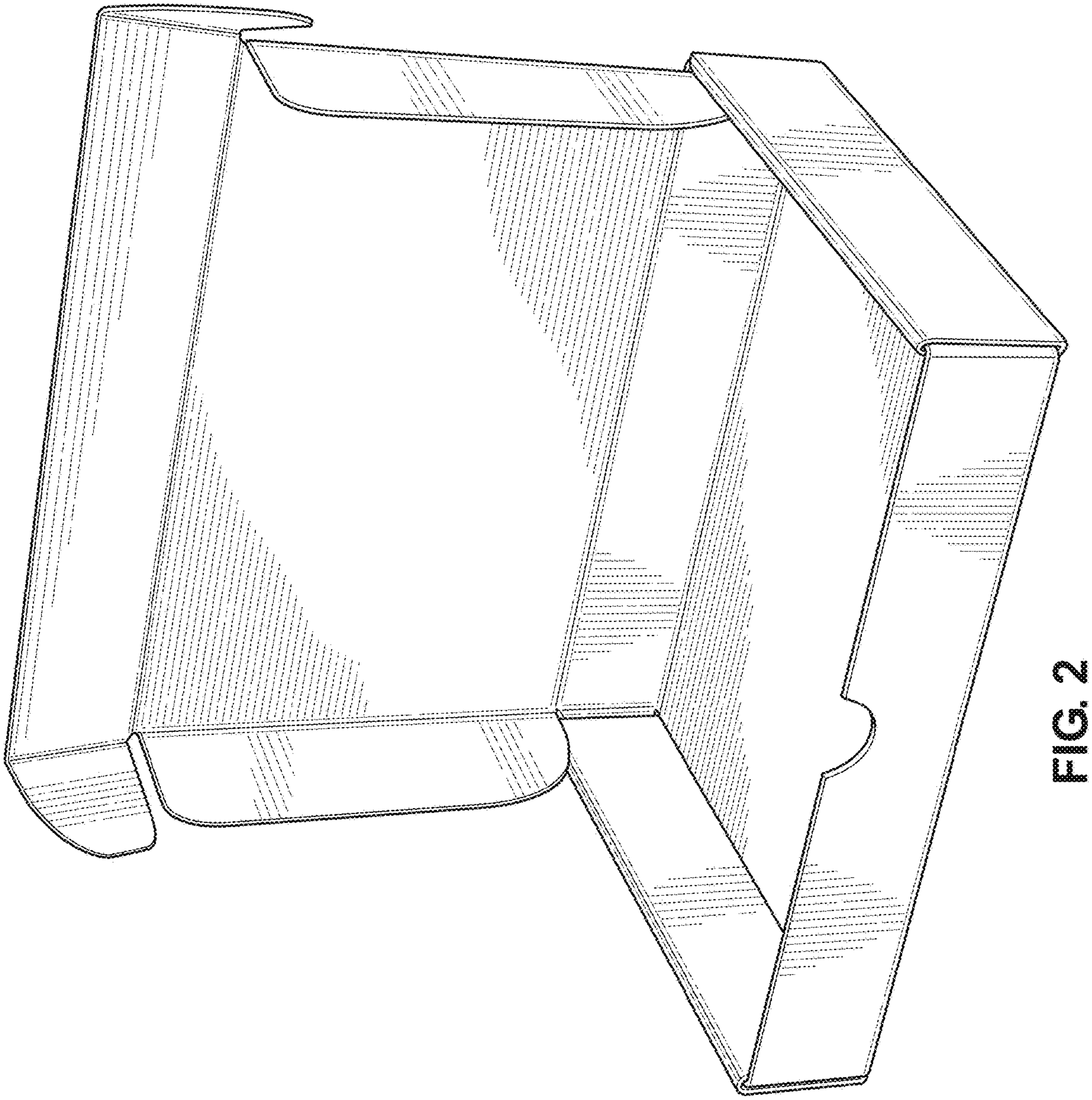
FIG. 2 illustrates an example of an open outer packaging.
Figure 3:
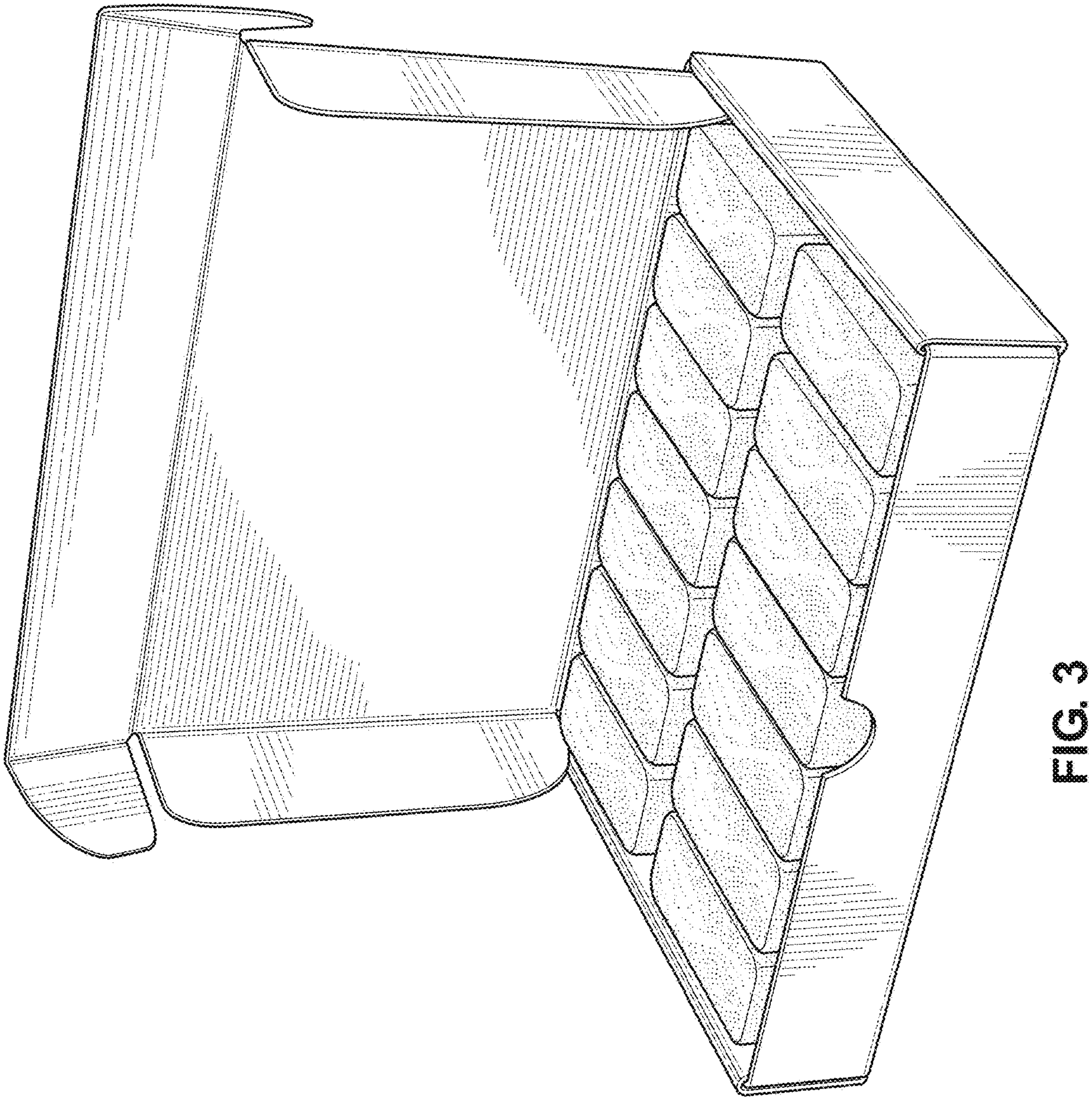
FIG. 3 illustrates an example of an open outer packaging including a plurality of cuboid detergent shaped bodies.

A detergent supply form, comprising the following, is suitable for achieving these objects:

a) an outer packaging made of cardboard in the form of a single-piece folding box with
   - a bottom surface and four side surfaces hinged to the bottom surface,
   - a top surface and at least three side surfaces hinged to the top surface, b) cuboid detergent shaped bodies, wherein i) the outer packaging has a fill-level of 85 vol % to 99 vol %, and ii) the side surfaces of the outer packaging hinged to the top surface overlap in the closed state with the side surfaces hinged to the bottom surface of the outer packaging.

Surprisingly, it turns out that, in outer packagings with a high fill-level, the overlapping of the side surfaces of the outer packagings characterizing the subject matter of the claim brings about an improvement in the storage and transportation stability of the shaped bodies.

The outer packaging is preferably designed as a single-piece folding box. Preferred outer packagings have a flat bottom surface the largest diagonal of which is greater than the height of the outer packaging. This design of the outer packaging increases its stability and enables simple opening and removal. It is particularly preferred if the outer packaging has a flat bottom surface the largest diagonal of which is more than twice, and preferably more than four times, the height of the outer packaging.

To achieve the high fill-level, it has proven advantageous for the outer packaging to have an angular bottom surface, preferably a quadrilateral bottom surface, and very particularly preferably a rectangular bottom surface. For the same reason, and for improving the stackability of the outer packagings, it is preferred that the outer packaging have a top surface that is plane-parallel to the bottom surface. Outer packagings in cuboid form are particularly preferred.

For increasing storage stability, and in particular the chemical stabilization of the detergent shaped bodies, it has proven advantageous for the outer packaging to be reclosable. Suitable closure elements are, for example, adhesive, latching, snapping, or plug-in elements, wherein adhesive and plug-in elements are particularly preferred. Exemplary closure elements are plug-in closures or removable adhesive closures.

For reasons of sustainability, recycled and/or recyclable materials are preferred for the production of the outer packaging. The packaging materials are preferably based upon renewable raw materials. The use of packaging materials based upon pulp and wastepaper is particularly preferred.

In a first preferred embodiment, the outer packaging is made of cardboard. In addition to its availability and recyclability, the advantages of cardboard lie in the great variability of available types and grammages. Preferred cardboards have a grammage of 150 to 400 g/m$^2$.

In a particularly preferred embodiment, the corrugated cardboard, which has proven to be technically superior to cardboard in some respects, is used for manufacturing the outer packaging. Corrugated cardboard is characterized by a high strength with low net weight and is a suitable means for storage and transportation even in large containers.

Another significant technical advantage of corrugated cardboard in connection with the present invention is its hollow volume. The design of the side walls of the outer packaging, including cavities, has surprisingly proven to be advantageous for the physical stability of the detergent shaped bodies. Preferably, at least one of the side walls has a hollow volume which is at least 10 vol % of the volume of the side wall. Further improved stabilization of the detergent shaped bodies can be achieved if at least two of the side walls have hollow volumes which are at least 10 vol % of the volume of the respective side wall, wherein it is particularly advantageous if two side walls of the outer packaging which are opposite one another have hollow volumes which are at least 10 vol % of the volume of the respective side wall. Very particular preference is given to detergent supply forms in which all side walls of the outer packaging have hollow volumes which are at least 10 vol % of the volume of the respective side wall.

In addition to physical stability, even the chemical stability of the detergent shaped bodies is surprisingly also promoted by the integration of hollow volume into the side walls of the outer packaging. A conceivable explanation is that water ingress from the outside into the interior of the outer packaging is made more difficult by the hollow volume interrupting the material of the side walls, and/or the hollow volume in the side walls cushions against moisture ingress.

For the aforementioned reasons, particularly preferred outer packagings have one or more side walls in which the hollow volume is at least 20 vol %, and preferably at least 40 vol %, of the volume of the respective side wall.

The hollow volume in the side walls of the outer packaging can be realized, for example, by the use of corrugated cardboard. A preferred alternative or supplement to the corrugated cardboard is provided by folded boxes or hollow-edge boxes, which, due to their construction, are suitable for realizing hollow volumes in the range of 10 vol % and more.

As already stated, preferred outer packagings are resealable. A particularly preferred embodiment is folding boxes with folding lids, wherein, in the closed state, parts of the lid preferably overlap with other parts of the box at least partially. By way of example are detergent supply forms in which the outer packaging is present in the form of a single-piece folding box and has a bottom surface and four side surfaces hinged to the bottom surface, as well as a top surface and at least three side surfaces hinged to the top surface, and, in the closed state, the side surfaces of the outer packaging hinged to the top surface overlap with the side surfaces hinged to the bottom surface of the outer packaging, such that the outer sides of the side surfaces hinged to the top surface are in contact with the inner sides of the side surfaces hinged to the bottom surface of the outer packaging. In a preferred embodiment of this detergent supply form, at least 30%, preferably at least 60%, and in particular at least 80%, of the area of the outer sides of the side surfaces hinged to the top surface overlaps with at least 30%, preferably at least 60%, and in particular at least 80%, of the area of the inner sides of the side surfaces hinged to the bottom surface of the outer packaging.

In this embodiment, the lid closure is preferably reinforced by friction of the overlapping box parts. This type of lid closure, in which the side surfaces hinged to the lid surfaces are guided into the interior of the box, can, in the case of high fill-levels, and in particular in the case of the outer packaging being filled with detergent shaped bodies which increase their volume during the course of storage, lead to problems during lid closure, since the side surfaces hinged to the top surface can be inserted into the interior of the box only with difficulty.

Against this background, it may be appropriate to provide alternative detergent supply forms in which the outer packaging is in the form of a single-piece folding box and has a bottom surface and four side surfaces hinged to the bottom surface, as well as a top surface and at least three side surfaces hinged to the top surface, and, in the closed state, the side surfaces of the outer packaging hinged to the top surface overlap with the side surfaces hinged to the bottom surface of the outer packaging in such a way that at least one inner side of a side surface hinged to the top surface is in contact with at least one outer side of the side surfaces hinged to the bottom surface of the outer packaging.

For the reasons mentioned above, detergent supply forms are also preferred in which the outer packaging is present in the form of a single-piece folding box and has a bottom surface and four side surfaces hinged to the bottom surface, and a top surface and at least three side surfaces hinged to the top surface, and, in the closed state, the side surfaces of the outer packaging hinged to the top surface overlap with the side surfaces hinged to the bottom surface of the outer packaging in such a way that all inner sides of the side surfaces hinged to the top surface are in contact with the outer sides of the side surfaces hinged to the bottom surface of the outer packaging.

In a further alternative embodiment, the outer packaging is in the form of a single-piece folding box with

- a bottom surface and four side surfaces hinged to the bottom surface,
- a top surface and four side surfaces hinged to the top surface,
- an intermediate surface which connects a side surface of the bottom surface to a side surface of the top surface, wherein, in the closed state, the side surfaces of the outer packaging hinged to the top surface overlap with the side surfaces hinged to the bottom surface of the outer packaging in such a way that three of the inner sides of the side surfaces hinged to the top surface are in contact with the outer sides of the side surfaces hinged to the bottom surface of the outer packaging, and the intermediate surface is located between the outer side of the side surface connected to it and hinged to the bottom surface, and the inner side of the side surface connected to it and hinged to the top surface. This embodiment enables an easier opening of the outer packaging. At the same time, in the closed state, the outer packaging forms a triply-overlapping side surface in the region of the intermediate surface, which side surface is formed from a side surface hinged to the bottom surface, the intermediate surface, and the side surface hinged to the top surface. This reinforced side wall stabilizes the outer packaging during storage and transportation.

In a preferred embodiment of the three last-mentioned detergent supply forms, at least 30%, preferably at least 60%, and in particular at least 80%, of the surface of the inner sides of the side surfaces hinged to the top surface overlap with at least 30%, preferably at least 60%, and in particular at least 80%, of the area of the outer sides of the side surfaces hinged to the bottom surface of the outer packaging.

The previously described outer packagings with overlapping side walls can be repeatedly opened and closed with no significant reduction in the friction occurring between the overlapping side walls. The preferred embodiment of the side walls with cavities is suitable for further improving this resealability. A possible explanation for this may be a compressibility of the side walls caused by the cavities.

A feature of preferred outer packaging is the Cobb value of the cardboard used for its production in the range below 25 $g/m^2$, and preferably below 20 $g/m^2$. The Cobb value is a quantity which describes the resistance of paper and cardboard to the absorption of moisture into the material. A high Cobb value means that water penetrates more easily. A low Cobb value means that water penetrates the material only with difficulty. The determination of the Cobb value takes place according to DIN EN ISO 535 under 20 $g/m^2$ at 20° C. and standard pressure. Particularly preferred detergent product forms are characterized in that the cardboard used to produce the folding box has a Cobb value below 25 $g/m^2$, and preferably below 20 $g/m^2$.

Corresponding Cobb values can be realized in different ways. In an alternative embodiment, the outer packaging comprises, for example, a water-insoluble cover film, and preferably a polyethylene cover film. Water-insoluble cover films are generally suitable for preventing or at least reducing the ingress of water or water vapor through the outer packaging into the interior of the outer packaging.

To avoid superfluous packaging components, water-insoluble cover films are preferably applied only to the outer or inner side of the outer packaging. For effective limitation of the ingress of moisture, a full-area coverage is preferred.

In addition to an improved printability of the outer packaging surface, the advantages of the full-area coverage of the outer side of the outer packaging lie in the prevention of the ingress of water into the cellulose-based packaging material, whereby, for example, the formation of superficial water stains or swelling of the outer packaging is prevented.

The full-area coverage of the inner side of the outer packaging has surprisingly proven advantageous for the adhesion of unpackaged detergent shaped bodies, and in particular of unpackaged detergent tablets. In the case of a combination of unpackaged tablet and the cardboard forming the outer packaging being covered on the inner side with a water-insoluble cover film, the adhesion of shaped bodies to the surface of the cardboard is increased, as a result of which—in particular, during transport—the sliding and associated mechanical impacts and damage to the shaped bodies in the outer packaging are reduced.

Despite the technical advantages listed above, it may be preferred for reasons of sustainable production and packaging of the detergent shaped bodies if the outer packaging does not comprise any water-insoluble cover film.

Biodegradable hydrophobizing coatings or impregnations have proven themselves as alternatives to water-insoluble cover films. Particularly preferred is the use of biodegradable hydrophobizing coatings or impregnations which comprise a substance from the group of vegetable oils, vegetable or animal waxes, lignin and lignin derivatives, celluloses and cellulose derivatives, polylactic acid and polylactic acid derivatives.

An essential feature of the detergent supply form according to the invention is its high fill-level of 85 to 99 vol % of the outer packaging. This high fill-level not only reduces the amount of packaging material that can be used for each detergent shaped body, but surprisingly also increases the physical stability of the detergent shaped bodies, not only with regard to fracturing of the shaped body, but also with respect to abrasion of the shaped body. The fill-level of preferred outer packagings is 88 vol % and 99 vol %, and preferably 92 vol % and 99 vol %. The term, "fill-level," refers to that proportion of the internal volume of the outer packaging which is taken up by the detergent shaped bodies in the outer packaging.

An essential component of the detergent supply form according to the invention is the detergent shaped body. A "shaped body" is a single body that stabilizes itself in the shape imparted to it. This dimensionally stable body is formed from a molding compound (e.g., a composition) in such a way that this molding compound is deliberately brought into a prespecified shape, e.g., by pouring a liquid composition into a casting mold and then curing the liquid composition, or by compacting a particulate preliminary mixture—for example, in the context of a tableting process.

Not only offer forms for textile washing, but also offer forms for cleaning hard surfaces such as ceramics, glass, metal, or tiles, are referred to as detergent shaped bodies. Particularly preferred are detergent shaped bodies, and in particular detergent shaped bodies for textile washing, since they are usually characterized by a comparatively low hardness due to the need for rapid disintegration in the washing liquor. The detergent shaped bodies preferably have a weight of 14 g to 42 g, preferably of 20 g to 38 g, and in particular of 24 g to 34 g.

Due to their manufacturability and their properties relating to removal from the outer packaging, detergent shaped bodies which have a flat bottom surface, the largest diagonal of which is more than twice, and preferably more than four times, the height of the detergent shaped bodies are preferred.

It is particularly preferred if the detergent shaped bodies are present as tablets or comprise tablets.

The cuboid detergent shaped bodies comprise a bottom surface, a top surface, and a side surface connecting the bottom surface and the top surface. It has also proven advantageous for the stability of the shaped bodies if the edges bounding the bottom surface and the top surface are chamfered. To increase the stability of the shaped bodies, it may also be appropriate to round off the edges of the side surfaces connecting the bottom surfaces and the top surfaces.

The density of preferred detergent shaped bodies is 1.1 $g/cm^3$ to 1.5 $g/cm^3$, and preferably 1.15 $g/cm^3$ to 1.3 $g/cm^3$. As a consequence of the high density of the shaped bodies and the high fill-level, the detergent supply forms according to the invention have comparatively high densities—for example, densities in the range of 0.9 $g/cm^3$ to 1.4 $g/cm^3$, and preferably in the range of 1.05 $g/cm^3$ to 1.3 $g/cm^3$.

Preferred detergent shaped bodies have a rough top surface or a rough bottom surface, the average roughness of which is from 25 μm to 1,000 μm, and preferably from 50 μm to 800 μm. Roughness describes the deviation of a real surface from an ideally smooth surface and is determined, for example, by means of confocal laser-scanning microscopy.

The roughness values preferred according to the invention reduce abrasion of the shaped bodies during production and transportation, and at the same time ensure sufficient adhesion of the shaped bodies to the material of the outer packaging and to the other shaped bodies located in the outer packaging, as a result of which they are stabilized within the outer packaging.

To improve their integrity, the detergent shaped bodies can have a film packaging, wherein it is particularly preferred if each of the detergent shaped bodies has a separate film packaging.

If film packagings are used, film packagings made of a water-soluble film material are preferred. The water-soluble film material may comprise one or more, structurally different, water-soluble polymer(s). Suitable water-soluble polymer(s) are in particular polymers from the group of (optionally acetalized) polyvinyl alcohols (PVAL) and copolymers thereof.

Water-soluble films are preferably based upon a polyvinyl alcohol or a polyvinyl alcohol copolymer, of which the molecular weight is in the range of 10,000 to 1,000,000 $gmol^{-1}$, preferably of 20,000 to 500,000 $gmol^{-1}$, particularly preferably of 30,000 to 100,000 $gmol^{-1}$, and in particular of 40,000 to 80,000 $gmol^{-1}$.

The production of the polyvinyl alcohol and polyvinyl alcohol copolymers generally includes the hydrolysis of intermediate polyvinyl acetate. Preferred polyvinyl alcohols and polyvinyl alcohol copolymers have a degree of hydrolysis of 70 to 100 mol %, preferably 80 to 90 mol %, particularly preferably 81 to 89 mol %, and in particular 82 to 88 mol %.

Preferred polyvinyl alcohol copolymers include, in addition to vinyl alcohol, an ethylenically unsaturated carboxylic acid, or the salt or ester thereof. In addition to vinyl alcohol, such polyvinyl alcohol copolymers particularly preferably include sulfonic acids, such as 2-acrylamido-2-methyl-1-propane sulfonic acid (AMPS), acrylic acid, methacrylic acid, acrylic esters, methacrylic esters, or mixtures thereof, among the esters, preference is given to C1-4-alkyl esters or hydroxyalkyl esters. Ethylenically unsaturated dicarboxylic acids, e.g., itaconic acid, maleic acid, fumaric acid, and mixtures thereof, are possible as further monomer.

Due to their availability, easy processability, and biodegradability, film packagings are preferred which consist of at least 40 wt %, preferably at least 60 wt %, and in particular at least 80 wt %, polyvinyl alcohol.

To increase the stability of the shaped bodies and to ensure a sufficient fill-level in the outer packaging, it is preferred that the film packaging be shrunk onto the detergent shaped bodies.

For reasons relating to the sustainable design of the detergent supply form, it may be appropriate to dispense with a film packaging for the detergent shaped bodies.

In fact, the detergent shaped bodies have proven to be unexpectedly stable in the detergent product forms according to the invention. This also applies in particular to detergent tablets, which tend to have reduced transportation and storage stability due to their hygroscopicity—for example, due to the integration of tablet disintegrants.

Detergent shaped bodies, which are particularly preferably suitable for packaging in the detergent supply forms according to the invention, are in particular detergent shaped bodies which have a water absorption (2 weeks, 35° C., 80% relative humidity) of over 20 mg/g, and preferably over 30 mg/g.

Also suitable for packaging in the detergent supply forms are detergent shaped bodies which have a volume expansion (2 weeks, 35° C., 80% relative humidity) of over 5 vol %, preferably over 7 vol %, and in particular of 8 vol % to 18 vol %. This type of increase in volume can be observed, for example, in detergent shaped bodies which contain a disintegration aid, and in particular a polymeric disintegration aid—for example, a disintegration aid based upon polyvinylpyrrolidone or cellulose.

In order to reduce the proportion of packaging per detergent shaped body, it is preferred if the detergent supply form comprise at least ten, preferably at least twenty, and particularly preferably at least thirty, detergent shaped bodies which are in a sorted arrangement in the outer packaging.

In the integration of a larger number of detergent shaped bodies into the detergent supply form, the stability of the shaped bodies can be further improved by a targeted arrangement of the shaped bodies. Detergent supply forms have proven to be advantageous which comprise at least ten, preferably at least twenty, and particularly preferably at least thirty, detergent shaped bodies which are in a sorted arrangement in the outer packaging, such that each of the detergent shaped bodies is in direct contact with at least three other detergent shaped bodies.

In summary, this application provides, inter alia, the following subject matter:

1. Detergent supply form, comprising
a) an outer packaging made of cardboard in the form of a single-piece folding box with
i) a bottom surface and four side surfaces hinged to the bottom surface,
ii) a top surface and at least three side surfaces hinged to the top surface,
b) cuboid detergent shaped bodies, wherein
i) the outer packaging has a fill-level of 85 vol % to 99 vol %, and
ii) the side surfaces of the outer packaging hinged to the top surface overlap in the closed state with the side surfaces hinged to the bottom surface of the outer packaging.

2. Detergent supply form according to point 1, wherein the outer packaging has a flat bottom surface the largest diagonal of which is greater than the height of the outer packaging.

3. Detergent supply form according to one of the preceding points, wherein the outer packaging has a flat bottom surface the largest diagonal of which is more than twice, and preferably more than four times, the height of the outer packaging.

4. Detergent supply form according to one of the preceding points, wherein the outer packaging has an angular bottom surface, preferably a quadrilateral bottom surface, and very particularly preferably a rectangular bottom surface.

5. Detergent supply form according to one of the preceding points, wherein the outer packaging has a top surface parallel to the bottom surface.

6. Detergent supply form according to one of the preceding points, wherein the outer packaging has a cuboid shape.

7. Detergent supply form according to one of the preceding points, wherein the outer packaging can be reclosed.

8. Detergent supply form according to one of the preceding points, wherein the detergent shaped body has a weight of 14 g to 42 g, preferably of 20 g to 38 g, and in particular of 24 g to 34 g.

9. Detergent supply form according to one of the preceding points, wherein the detergent shaped bodies are present as tablets or comprise tablets.

10. Detergent supply form according to one of the preceding points, wherein the detergent shaped bodies have a flat bottom surface, the largest diagonal of which is more than twice, and preferably more than four times, the height of the detergent shaped bodies.

11. Detergent supply form according to one of the preceding points, comprising cuboid detergent tablets with a bottom surface, a top surface, and side surfaces connecting the bottom surface and the top surface, wherein the edges bounding the bottom surface and the top surface are chamfered.

12. Detergent supply form according to one of the preceding points, comprising cuboid detergent tablets with a bottom surface, a top surface, and side surfaces connecting the bottom surface and the top surface, wherein the edges of the side surfaces connecting the bottom sides and the top sides are rounded.

13. Detergent supply form according to one of the preceding points, wherein the detergent supply form comprises at least ten, preferably at least twenty, and particularly preferably at least thirty, detergent shaped bodies which are in a sorted arrangement in the outer packaging.

14. Detergent supply form according to one of the preceding points, wherein the detergent supply form comprises at least ten, preferably at least twenty, and particularly preferably at least thirty, detergent shaped bodies which are in a sorted arrangement in the outer packaging such that each of the detergent shaped bodies is in direct contact with at least three other shaped bodies.

15. Detergent supply form according to one of the preceding points, wherein the detergent shaped bodies have a density of 1.1 $g/cm^3$ to 1.5 $g/cm^3$, and preferably of 1.15 $g/cm^3$ to 1.3 $g/cm^3$.

16. Detergent supply form according to one of the preceding points, wherein the detergent shaped bodies have a rough top surface or a rough bottom surface, the average roughness of which is 25 μm to 1,000 μm, and preferably 50 μm to 800 μm.

17. Detergent supply form according to one of the preceding points, wherein the particles have a fill-level of 88 vol % to 99 vol %, and preferably 92 vol % to 99 vol %.

18. Detergent supply form according to one of the preceding points, wherein, in the closed state, the side surfaces of the outer packaging hinged to the top surface overlap with the side surfaces hinged to the bottom surface of the outer packaging in such a way that the outer sides of the side surfaces hinged to the top surface are in contact with the inner sides of the side surfaces hinged to the bottom surface of the outer packaging.

19. Detergent supply form according to point 18, wherein at least 30%, preferably at least 60%, and in particular at least 80%, of the area of the outer sides of the side surfaces hinged to the top surface overlap with at least 30%, preferably at least 60%, and in particular at least 80%, of the area of the inner sides of the side surfaces hinged to the bottom surface of the outer packaging.

20. Detergent supply form according to one of the preceding points, wherein, in the closed state, the side surfaces of the outer packaging hinged to the top surface overlap with the side surfaces hinged to the bottom surface of the outer packaging in such a way that at least one inner side of a side surface hinged to the top surface is in contact with at least one outer side of the side surfaces hinged to the bottom surface of the outer packaging.

21. Detergent supply form according to one of the preceding points, wherein, in the closed state, the side surfaces of the outer packaging hinged to the top surface overlap with the side surfaces hinged to the bottom surface of the outer packaging in such a way that all inner sides of the side surfaces hinged to the top surface are in contact with the outer sides of the side surfaces hinged to the bottom surface of the outer packaging.

22. Detergent supply form according to one of the preceding points, comprising an outer packaging made of cardboard in the form of a single-piece folding box with i) a bottom surface and four side surfaces hinged to the bottom surface, ii) a top surface and four side surfaces hinged to the top surface, iii) an intermediate surface which connects a side surface of the bottom surface to a side surface of the top surface, wherein, in the closed state, the side surfaces of the outer packaging hinged to the top surface overlap with the side surfaces hinged to the bottom surface of the outer packaging in such a way that three of the inner sides of the side surfaces hinged to the top surface are in contact with the outer sides of the side surfaces hinged to the bottom surface of the outer packaging, and the intermediate surface is located between the outer side of the side surface connected to it and hinged to the bottom surface, and the inner side of the side surface connected to it and hinged to the top surface.

23. Detergent supply form according to one of points 20 through 22, wherein at least 30%, preferably at least 60%, and in particular at least 80%, of the area of the inner sides of the side surfaces hinged to the top surface overlap with at least 30%, preferably at least 60%, and in particular at least 80%, of the area of the outer sides of the side surfaces hinged to the bottom surface of the outer packaging.

24. Detergent supply form according to one of the preceding points, wherein the outer packaging is made of cardboard.

25. Detergent supply form according to one of the preceding points, wherein the outer packaging is made of corrugated cardboard.

26. Detergent supply form according to one of the preceding points, wherein the outer packaging is designed as a folded box.

27. Detergent supply form according to one of the preceding points, wherein the outer packaging is designed as a hollow-edge box.

28. Detergent supply form according to one of the preceding points, wherein at least one of the side surfaces, and preferably at least two of the side surfaces, of the outer packaging, has a cavity or several cavities, the volume of which is at least 10 vol %, preferably at least 20 vol %, and in particular at least 40 vol %, of the volume of the respective side surface.

29. Detergent supply form according to one of the preceding points, wherein at least two opposing side surfaces of the outer packaging have a cavity or several cavities, the volume of which is at least 10 vol %, preferably at least 20 vol %, and in particular at least 40 vol %, of the volume of the respective side surface.

30. Detergent supply form according to one of the preceding points, wherein all side surfaces of the outer packaging have a cavity or several cavities, the volume of which is at least 10 vol %, preferably at least 20 vol %, and in particular at least 40 vol %, of the volume of the respective side face.

31. Detergent supply form according to one of the preceding points, wherein the cardboard used for producing the folding box has a Cobb value below 25 g/m$^2$, and preferably below 20 g/m$^2$.

32. Detergent supply form according to one of the preceding points, wherein the outer packaging comprises a water-insoluble cover film, and preferably a polyethylene cover film.

33. Detergent supply form according to one of the preceding points, wherein the outer packaging comprises a water-insoluble cover film—preferably a polyethylene cover film—which covers the outer packaging on its outer side—preferably over the entire surface.

34. Detergent supply form according to one of the preceding points, wherein the outer packaging comprises a water-insoluble cover film—preferably a polyethylene cover film—which preferably covers the outer packaging over its entire surface on its inner side.

35. Detergent supply form according to one of the preceding points, wherein the outer packaging does not comprise a water-insoluble cover film.

36. Detergent supply form according to one of the preceding points, wherein the outer packaging has a biodegradable hydrophobizing coating or impregnation.

37. Detergent supply form according to one of the preceding points, wherein the outer packaging has a biodegradable hydrophobizing coating or impregnation which comprises a substance from the group of vegetable oils, vegetable or animal waxes, lignin and lignin derivatives, celluloses and cellulose derivatives, polylactic acid and polylactic acid derivatives.

38. Detergent supply form according to one of the preceding points, wherein the detergent shaped bodies have a film packaging.

39. Detergent supply form according to one of the preceding points, wherein each of the detergent shaped bodies has a separate film packaging.

40. Detergent supply form according to one of the preceding points, wherein the detergent shaped bodies have a film packaging made of a water-soluble film material.

41. Detergent supply form according to one of the preceding points, wherein the detergent shaped bodies have a film packaging which consists of polyvinyl alcohol of at least 40 wt %, preferably at least 60 wt %, and in particular at least 80 wt %.

42. Detergent supply form according to one of the preceding points, wherein the detergent shaped bodies have a film packaging which is shrunk onto the detergent shaped body.

43. Detergent supply form according to one of the preceding points, wherein the detergent shaped bodies do not have film packaging.

44. Detergent supply form according to one of the preceding points, wherein the detergent shaped bodies have a water absorption (2 weeks, 35° C., 80% relative humidity) of over 20 mg/g, and preferably over 30 mg/g.

45. Detergent supply form according to one of the preceding points, wherein the detergent shaped bodies have a volume expansion (2 weeks, 35° C., 80% relative humidity) of over 5 vol %, preferably over 7 vol %, and in particular of 8 vol % to 18 vol %.

46. Detergent supply form according to one of the preceding points, wherein the detergent shaped bodies contain a disintegration agent, and in particular a polymeric disintegration agent—for example, a disintegration agent based upon polyvinylpyrrolidone or cellulose.

The invention claimed is:

1. A detergent supply form, comprising:
- an outer packaging formed of a single-piece folding cardboard box having:
  - a bottom surface and four side surfaces hinged to the bottom surface, and
  - a top surface and at least three side surfaces hinged to the top surface,
- cuboid detergent shaped bodies in a sorted arrangement within the outer packaging, wherein:
- the cuboid detergent shaped bodies have a volume expansion of from 8 vol. % to 18 vol. %, at 2 weeks, 35° C., and 80% relative humidity,
- the outer packaging has a fill-level of from 88 vol % to 99 vol %, and
- in a closed state of the outer packaging, the side surfaces of the outer packaging hinged to the top surface overlap with the side surfaces hinged to the bottom surface of the outer packaging such that side surfaces hinged to the top surface are in contact with the side surfaces hinged to the bottom surface.

2. The detergent supply form of claim 1, wherein, in the closed state, outer sides of the side surfaces hinged to the top surface are in contact with inner sides of the side surfaces hinged to the bottom surface.

3. The detergent supply form of claim 1, wherein, in the closed state, inner sides of the side surfaces hinged to the top surface are in contact with outer sides of the side surfaces hinged to the bottom surface.

4. The detergent supply form of claim 1, wherein the outer packaging is formed of corrugated cardboard.

5. The detergent supply form of claim 4, wherein corrugations in at least one of the side surfaces of the outer packaging have a volume of that is at least 10 vol % of the volume of the at least one of the side surfaces.

6. The detergent supply form of claim 1, wherein the cuboid detergent shaped bodies have a water absorption of over 20 mg/g at 2 weeks, 35° C., and 80% relative humidity.

7. The detergent supply form of claim 1, wherein the fill-level of the outer packaging is 92 vol % to 99 vol %.

8. The detergent supply form of claim 5, wherein the volume of the corrugations in at least one of the side surfaces is at least 20 vol % of the volume of the at least one of the side surfaces.

9. The detergent supply form of claim 8, wherein the volume of the corrugations in at least one of the side surfaces is at least 40 vol % of the volume of the at least one of the side surfaces.

10. The detergent supply form of claim 6, wherein the cuboid detergent shaped bodies have a water absorption of over 30 mg/g at 2 weeks, 35° C., and 80% relative humidity.

11. The detergent supply form of claim 1, wherein:

each of the cuboid detergent shaped bodies has a lower face, an upper face, and a lateral face connecting the lower face and the upper face, a diagonal of the lower face is more than twice a height of the lateral face, and the lower face of each of the cuboid detergent shaped bodies rests directly on and plane-parallel to the bottom surface of the outer packaging.

12. The detergent supply form of claim 11, wherein the diagonal of the lower face is more than four times the height of the lateral face.

13. The detergent supply form of claim 1, wherein the bottom surface of the outer packaging is a rectangular bottom surface.

* * * * *